United States Patent
El-Refaie et al.

(10) Patent No.: US 7,622,817 B2
(45) Date of Patent: Nov. 24, 2009

(54) HIGH-SPEED HIGH-POLE COUNT GENERATORS

(75) Inventors: Ayman Mohamed Fawzi El-Refaie, Niskayuna, NY (US); Wei Wu, Canton, MI (US); John M. Kern, Rexford, NY (US)

(73) Assignee: General Electric Company, Schenectady, NY (US)

( * ) Notice: Subject to any disclaimer, the term of this patent is extended or adjusted under 35 U.S.C. 154(b) by 163 days.

(21) Appl. No.: 11/610,115

(22) Filed: Dec. 13, 2006

(65) Prior Publication Data

US 2008/0143108 A1    Jun. 19, 2008

(51) Int. Cl.
*F01D 15/10* (2006.01)
*F02C 6/00* (2006.01)
*H02K 7/18* (2006.01)

(52) U.S. Cl. .................................................. 290/52
(58) Field of Classification Search ............. 290/52
See application file for complete search history.

(56) References Cited

U.S. PATENT DOCUMENTS

| | | | |
|---|---|---|---|
| 3,663,848 A | 5/1972 | Lehoczky | 310/90 |
| 4,481,857 A * | 11/1984 | Havener | 84/454 |
| 4,503,363 A * | 3/1985 | Nilssen | 315/225 |
| 4,588,914 A | 5/1986 | Heyne | 310/156.11 |
| 4,868,406 A * | 9/1989 | Glennon et al. | 290/4 R |
| 5,808,452 A * | 9/1998 | Gyugyi et al. | 323/207 |
| 6,467,725 B1 * | 10/2002 | Coles et al. | 244/58 |
| 6,541,887 B2 | 4/2003 | Kawamura | 310/190 |
| 6,646,363 B2 | 11/2003 | Kylander et al. | 310/194 |
| 6,661,135 B2 | 12/2003 | Borden et al. | 310/68 D |
| 6,734,585 B2 | 5/2004 | Tornquist et al. | 310/61 |
| 6,809,600 B2 | 10/2004 | Chang et al. | 331/17 |
| 6,842,590 B2 | 1/2005 | Dalal et al. | 399/49 |
| 6,897,597 B1 | 5/2005 | Armiroli et al. | 310/263 |
| 6,903,468 B2 | 6/2005 | Korenaga | 310/12 |
| 7,245,040 B2 * | 7/2007 | Mukavetz et al. | 290/52 |
| 7,429,855 B2 * | 9/2008 | Rozman | 324/107 |
| 7,432,609 B2 * | 10/2008 | Obayashi et al. | 290/40 C |
| 7,449,795 B2 * | 11/2008 | Nelson | 290/52 |
| 7,511,385 B2 * | 3/2009 | Jones et al. | 290/43 |
| 7,541,687 B2 * | 6/2009 | Stahlhut et al. | 290/52 |
| 7,554,786 B2 * | 6/2009 | Kramer et al. | 361/232 |
| 2002/0117935 A1 | 8/2002 | Kanazawa et al. | 310/263 |
| 2002/0149276 A1 | 10/2002 | Borden et al. | 310/68 D |
| 2003/0094872 A1 | 5/2003 | Tornquist et al. | 310/91 |

(Continued)

*Primary Examiner*—Nicholas Ponomarenko
*Assistant Examiner*—Pedro J Cuevas
(74) *Attorney, Agent, or Firm*—McNees Wallace & Nurick, LLC

(57) ABSTRACT

A system for generating supplemental electrical power from the low-pressure (LP) turbine spool of a turbofan engine includes a high-speed, high magnetic pole count, generator, a gearbox, a controller and a power converter. The LP turbine spool is mechanically coupled to the generator portion by the gearbox for driving the generator portion. The controller portion has a speed-sensing element for sensing the LP turbine speed. The controller portion disables the power converter when the generator exceeds a predetermined speed, and enables the power converter when the generator portion is less or equal to the predetermined speed. The effective load on the generator is reduced to approximately zero when the LP turbine spool exceeds the predetermined speed, permitting the generator to be electrically bound up to the predetermined speed and mechanically bound in excess of the predetermined speed.

20 Claims, 6 Drawing Sheets

U.S. PATENT DOCUMENTS

| | | |
|---|---|---|
| 2004/0095563 A1 | 5/2004 | Korenaga .................... 355/51 |
| 2004/0164627 A1 | 8/2004 | Tornquist et al. .............. 310/59 |
| 2004/0245879 A1 | 12/2004 | Hirzel et al. ........... 310/156.01 |
| 2005/0073212 A1 | 4/2005 | Semones et al. ............ 310/216 |
| 2005/0093391 A1 | 5/2005 | McMullen et al. ..... 310/156.55 |
| 2005/0212373 A1 | 9/2005 | McDowall et al. .......... 310/214 |
| 2005/0245341 A1 | 11/2005 | Mueller et al. ................. 475/5 |
| 2006/0174629 A1* | 8/2006 | Michalko .................... 60/774 |
| 2006/0225431 A1* | 10/2006 | Kupratis ..................... 60/791 |
| 2006/0255775 A1* | 11/2006 | Kramer et al. .............. 323/247 |
| 2007/0013195 A1* | 1/2007 | Mukavetz et al. ............. 290/52 |
| 2008/0143108 A1* | 6/2008 | El-Refaie et al. ............. 290/43 |
| 2008/0148726 A1* | 6/2008 | Halsey et al. ................. 60/538 |
| 2008/0284369 A1* | 11/2008 | Jones et al. ................. 318/722 |
| 2009/0085354 A1* | 4/2009 | Tan et al. ...................... 290/44 |
| 2009/0146426 A1* | 6/2009 | Jones et al. ................... 290/44 |
| 2009/0146500 A1* | 6/2009 | Jones et al. ................... 307/82 |
| 2009/0147549 A1* | 6/2009 | Jones et al. ................... 363/37 |

* cited by examiner

HIGH-SPEED HIGH-POLE COUNT GENERATORS

FIELD OF THE INVENTION

The present invention is directed to an electrical generator for a gas turbine engine, and more particularly to a high-speed generator with high pole count.

BACKGROUND OF THE INVENTION

A gas turbine engine generally includes one or more compressors followed in turn by a combustor and high and low pressure turbines. These engine components are arranged in serial flow communication and disposed about a longitudinal axis centerline of the engine within an annular outer casing. The compressors are driven by the respective turbines and compressor air during operation. The compressor air is mixed with fuel and ignited in the combustor for generating hot combustion gases. The combustion gases flow through the high and low pressure turbines, which extract the energy generated by the hot combustion gases for driving the compressors, and for producing auxiliary output power.

The engine power is transferred either as shaft power or thrust for powering an aircraft in flight. For example, in other rotatable loads, such as a fan rotor in a by-pass turbofan engine, or propellers in a gas turbine propeller engine, power is extracted from the high and low pressure turbines for driving the respective fan rotor and the propellers.

It is well understood that individual components of turbofan engines, in operation, require different power parameters. For example, the fan rotational speed is limited to a degree by the tip velocity and, since the fan diameter is very large, rotational speed must be very low. The core compressor, on the other hand, because of its much smaller tip diameter, can be driven at a higher rotational speed. Therefore, separate high and low turbines with independent power transmitting devices are necessary to drive the fan and core compressor in aircraft gas turbine engines. Furthermore since a turbine is most efficient at higher rotational speeds, the lower speed turbine driving the fan requires additional stages to extract the necessary power.

Many new aircraft systems are designed to accommodate electrical loads that are greater than those on current aircraft systems. The electrical system specifications of commercial airliner designs currently being developed may demand up to twice the electrical power of current commercial airliners. This increased electrical power demand must be derived from mechanical power extracted from the engines that power the aircraft. When operating an aircraft engine at relatively low power levels, e.g., while idly descending from altitude, extracting this additional electrical power from the engine mechanical power may reduce the ability to operate the engine properly.

Traditionally, electrical power is extracted from the high-pressure (HP) engine spool in a gas turbine engine. The relatively high operating speed of the HP engine spool makes it an ideal source of mechanical power to drive the electrical generators connected to the engine. However, it is desirable to draw power from additional sources within the engine, rather than to rely solely on the HP engine spool to drive the electrical generators. The LP engine spool provides an alternate source of power transfer, however, the relatively lower speed of the LP engine spool typically requires the use of a gearbox, as slow-speed electrical generators are often larger than similarly rated electrical generators operating at higher speeds.

However, extracting this additional mechanical power from an engine when it is operating at relatively low power levels (e.g., at or near idle descending from altitude, low power for taxi, etc.) may lead to reduced engine operability. Traditionally, this power is extracted from the high-pressure (HP) engine spool. Its relatively high operating speed makes it an ideal source for mechanical power to drive electrical generators that are attached to the engine. However, it is desirable at times to increase the amount of power that is available on this spool, by transferring torque and power to it via some other means.

Many solutions to this transformation are possible, including various types of conventional transmissions, mechanical gearing, and electromechanical configurations. One such solution is a turbine engine that utilizes a third, intermediate-pressure (IP) spool to drive a generator independently. However, this third spool is also required at times to couple to the HP spool. The means used to couple the IP and HP spools are mechanical clutch or viscous-type coupling mechanisms.

U.S. Pat. No. 6,895,741, issued May 24, 2005, and entitled "Differential Geared Turbine Engine with Torque Modulation Capacity", discloses a mechanically geared engine having three shafts. The fan, compressor, and turbine shafts are mechanically coupled by applying additional epicyclic gear arrangements. The effective gear ratio is variable through the use of electromagnetic machines and power conversion equipment.

High-speed electric machines are almost always manufactured with low pole counts, lest the magnetic materials experience excessive core losses at higher frequencies that results in an inefficient motor design. This is primarily related to the fact that the soft material used in the vast majority of present motors is a silicon-iron alloy. It is well known that losses resulting from changing a magnetic field at frequencies greater than about 400 Hz in conventional silicon-iron based materials causes the material to heat, frequently to a point where the device cannot be cooled by any suitable means.

SUMMARY OF THE INVENTION

The present invention relates to a new system and apparatus for high-speed generators that can rotate mechanically up to a very high speed but generate electrical power based on a lower rotational speed. Usually one of the key limitations for the design of high-speed generators is the number of magnetic poles because it determines the fundamental electrical frequency and hence the power converter PWM frequency. The PWM frequency cannot exceed a certain limit in order to keep the converter switching losses within acceptable ranges. The number of magnetic poles has a significant effect on the size of the stator and rotor back iron and hence the size and weight of the generator. A generator with a high number of magnetic poles must be small and light-weight to stay within the frequency limit imposed by the converter operation. In addition, a high number of magnetic poles allows the use of tooth winding configuration that is fault-tolerant, which is a key issue in several applications especially the aerospace applications. If a machine operating at a wide speed range (in a direct-drive configuration) is only required to generate power over a narrower portion of its wide speed range, it is suggested to gear up the speed so that the number of magnetic poles are only limited by the frequency at the top speed for power generation. The machine can still mechanically rotate up to the maximum speed. Gearing up the speed will help reduce the size of the machine. Limiting the frequency at a much lower speed will allow the use of a higher number of magnetic poles, which will have a significant effect on reducing the size and weight of the machine. This machine can be of any type, e.g. switched reluctance, permanent magnet etc. Also it can be combined with other machines in the form of double-sided dual-rotor generators or single-stator dual-rotor generators for further reduction of overall system size and weight. This machine can either be a radial-flux or an axial-flux machine.

Another source of power within the engine is the low-pressure (LP) spool, which typically operates at speeds much slower than the high-pressure (HP) spool, and over a relatively wider speed range. Tapping this low-speed mechanical power source without transformation typically results in impractically large generators. The LP spool has a wider operating speed range, typically 1100-4500 rpm, however, the LP generator may require electrical power generation corresponding to about 2200 rpm during idle-descent, even though it will still be spinning up to 4500 rpm since it cannot be disengaged from the LP spool. One means of reducing the size of the generator is by stepping up the speed range, e.g., using a gear box, so that the machine is sized for a smaller torque for the same power. Since an active power converter controls the generator, practical limitations are imposed on the converter PWM frequency in order to reduce the converter switching losses and hence achieve good overall system efficiency. This limitation on the PWM frequency defines a limitation on the maximum machine fundamental frequency that in turn defines the number of magnetic poles. If this limitation is imposed at a lower speed, the machine can have a higher number of magnetic poles, resulting in a thickness reduction in the back iron of the stator and rotor portions. Hence, the overall machine size and weight is reduced, a critical parameter for aerospace applications.

The present invention is directed to a system for generating supplemental electrical power from the low-pressure (LP) turbine spool of a turbofan engine. The system includes a high-speed, high magnetic pole count, generator, a gearbox, a controller and a power converter. The LP turbine spool is mechanically coupled to the generator portion by the gearbox for driving the generator portion. The controller portion has a speed-sensing element for sensing the LP turbine speed. The controller portion disables the power converter when the generator exceeds a predetermined speed, and enables the power converter when the generator portion is less or equal to the predetermined speed. The effective load on the generator is reduced to approximately zero when the LP turbine spool exceeds the predetermined speed, permitting the generator to be electrically bound up to the predetermined speed and mechanically bound in excess of the predetermined speed.

The present invention is also directed to system for generating supplemental electrical power from the low-pressure (LP) turbine spool of a turbofan engine, the system having a generator portion for generating electrical power having a stator back iron portion and a rotor back iron portion, the stator back iron portion and the rotor back iron portion having significantly reduced thickness relative to low magnetic pole count generators. The system also includes a gearbox for driving the generator portion, a controller portion for controlling an output of the generator, a power converter for converting generator power to power a load and the LP turbine spool being mechanically coupled to the generator portion by the gearbox for driving the generator portion. Further the system includes the controller portion in electrical communication with a speed-sensing element for sensing a speed of the LP turbine spool. During operation of the engine, the controller portion is configured to disable the power converter in response to the speed of the generator portion exceeding a predetermined speed, and to enable the power converter when the speed of the generator portion does not exceed the predetermined speed, such that the effective load on the generator portion is reduced to approximately zero when the LP turbine spool exceeds the predetermined speed.

An advantage of the present invention is the use of a number of magnetic poles that is greater than conventional related devices that make feasible concentrated and isolated armature windings that exhibit increased fault tolerance. For even further reduction of overall generator weight, the high-speed generator can be combined with other HP spool generators in the form of double-sided dual-rotor or single-stator dual-rotor configurations.

Another advantage is the ability to extract electrical power from the LP spool and combination of HP and LP generators, to provide significant weight and size reduction in the generator.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
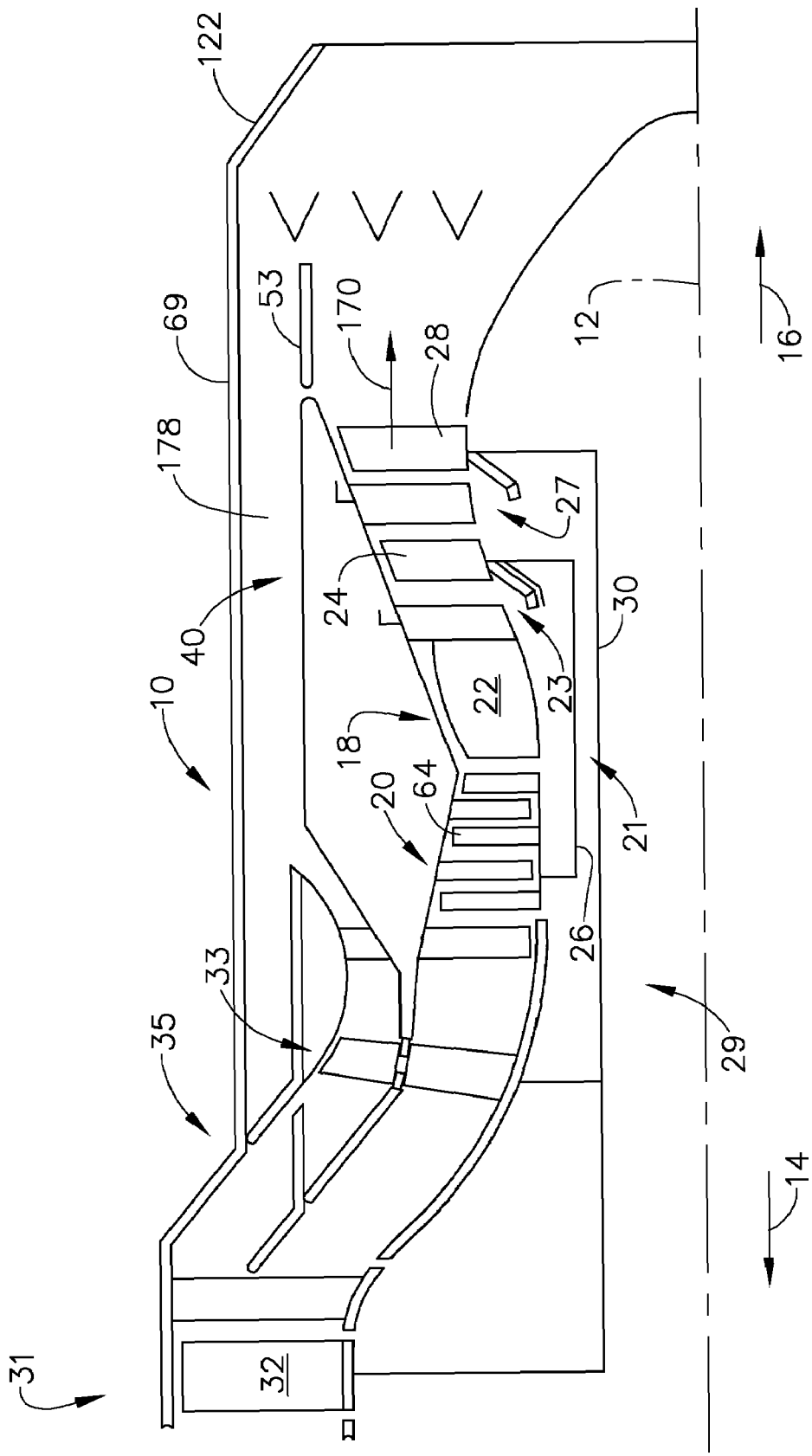
FIG. 1 is a longitudinal sectional view schematic illustration of an exemplary aircraft turbofan gas turbine engine.

Shown in FIG. 1 is an exemplary turbofan engine 10 having a generally axially extending axis or centerline 12 generally extending in a forward direction 14 and an aft direction 16. The bypass turbofan engine 10 includes a core engine 18 (also called a gas generator) which includes a high pressure compressor 20, a combustor 22, and a high pressure turbine (HPT) 23 having a row of high pressure turbine blades 24, all arranged in a serial, axial flow relationship. High-pressure compressor blades 64 of the high-pressure compressor 20 are fixedly connected in driving engagement to the high pressure turbine blades 24 by a larger-diameter annular core engine shaft 26 which is disposed coaxially about the centerline 12 of the engine 10 forming a high pressure spool 21.

A combustor 22 in the core engine 18 mixes pressurized air from the high-pressure compressor 20 with fuel and ignites the resulting fuel and air mixture to produce combustion gases. Some work is extracted from these gases by the high-pressure turbine blades 24 causing the blades 24 to rotate, and by this rotation driving the high-pressure compressor 20. The combustion gases are discharged from the core engine 18 into a power turbine or low-pressure turbine (LPT) 27 having a row of low-pressure turbine blades 28. The low-pressure turbine blades 28 are fixedly attached to a smaller diameter annular low-pressure shaft 30 that is disposed coaxially about the centerline 12 of the engine 10 within the core engine shaft 26 forming a low-pressure spool 29. The low-pressure shaft 30 rotates axially spaced-apart first and second stage fans 31 and 33 of an engine fan section 35. The first and second stage fans 31 and 33 include first and second stage rows of generally radially outwardly extending and circumferentially spaced-apart first and second stage fan blades 32 and 36, respectively.

A fan bypass duct 40 circumscribes the second stage fan 33 and the core engine 18. Core discharge airflow 170 is discharged from the low pressure turbine 27 to mix with a bypass airflow 178 discharged from the fan bypass duct 40 through a rear variable area bypass injector (VABI) 53. Mixing takes place in a tail pipe 69 in which exhaust flow is formed, which is discharged through a variable area exhaust nozzle 122. An optional afterburner 130 may be used to increase the thrust potential of the engine 10.

Figure 2:
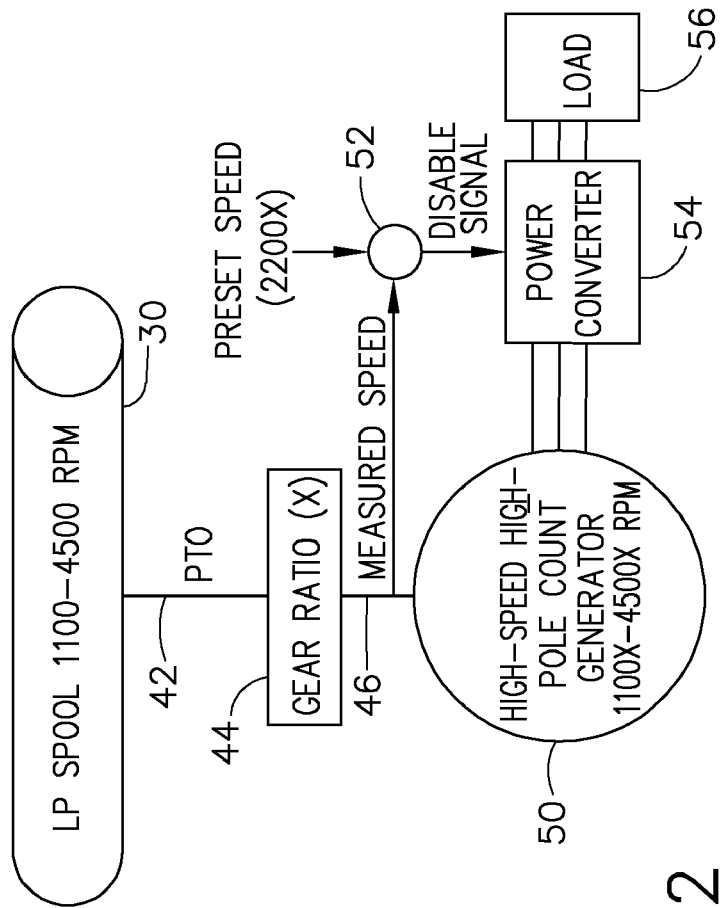
FIG. 2 is a diagrammatic representation of the generator drive train of the present invention.

Referring next to FIG. 2, an electromagnetic generator 50 of the present invention is coupled with a gearbox 44 through a connecting shaft 46. The gear box 44 is driven by LP spool 30 through a power take-off (PTO) 42. The ratio of the gear box 44 is designated as (x). The ratio x is normally a multiplier in the range of five to ten, although the range may be higher or lower for specific applications if so required. The electromagnetic generator is designed to rotate mechanically at speeds up to 4500×revolutions per minute (rpm). During idle descent of an aircraft, when the engine 10 is operating in a range of 1100 rpm to 2200 rpm, the generator 50 is required to generate electrical power up to 2200×rpm. During normal flight operation the engine 10 operates in a higher speed range of 2200 rpm to 4500 rpm.

When the generator 50 is driven by gearbox 44 at speeds in excess of 2200×rpm, a generator controller 52 disables a power converter 54 connected to the generator output, for example, by using contactors or by disabling gate signals to semiconductor devices within the power converter, effectively reducing the load 56 on the generator 50 to zero. This allows the machine to operate at high speeds while at the same time having a high number of magnetic poles, and thereby preventing the generator 50 from exceeding the fundamental frequency limit at 2200×rpm. The fundamental frequency limit is imposed by the maximum practical pulse width modulated (PWM) frequency that can be achieved in the electrical active power converter. Depending on the power level, the limit on the PWM frequency is set based on the switching capabilities of the semiconductor devices used as well as the available thermal management of the power converter. The switching losses increase in proportion to the PWM, thus affecting the power converter and system efficiencies. Also, higher PWM frequency generates more heat, and thus requires greater cooling capacity. The high number of magnetic poles allows the use of concentrated isolated armature windings that are fault-tolerant in nature.

Figure 3:
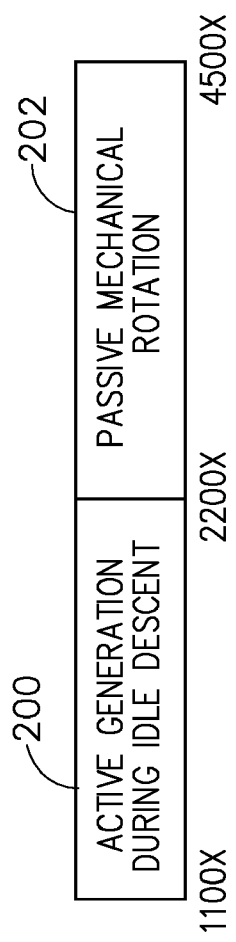
FIG. 3 is a diagram of the active and passive speed ranges of the generator.

FIG. 3 is a diagram showing the speed range in which there is active generation versus the speed range in which the generator 50 is in a passive mechanical rotation mode. The active speed range 200 preferably occurs between 100× and 2200×, which as indicated above, is the normal operating range of the engine 50 during idle descent. The passive speed range 202 is above 2200×, up to about 4500×, which is the engine speed during normal flight.

In the embodiment shown in the figures the generator 50 is a permanent magnet, but this generator 50 may be any type of a suitable generator such as, but not limited to, e.g., switched reluctance, permanent magnet, wound-field, and other configurations, as well as a radial-flux or axial-flux machine. Also the generator 50 can have any number of phases.

Figure 5:
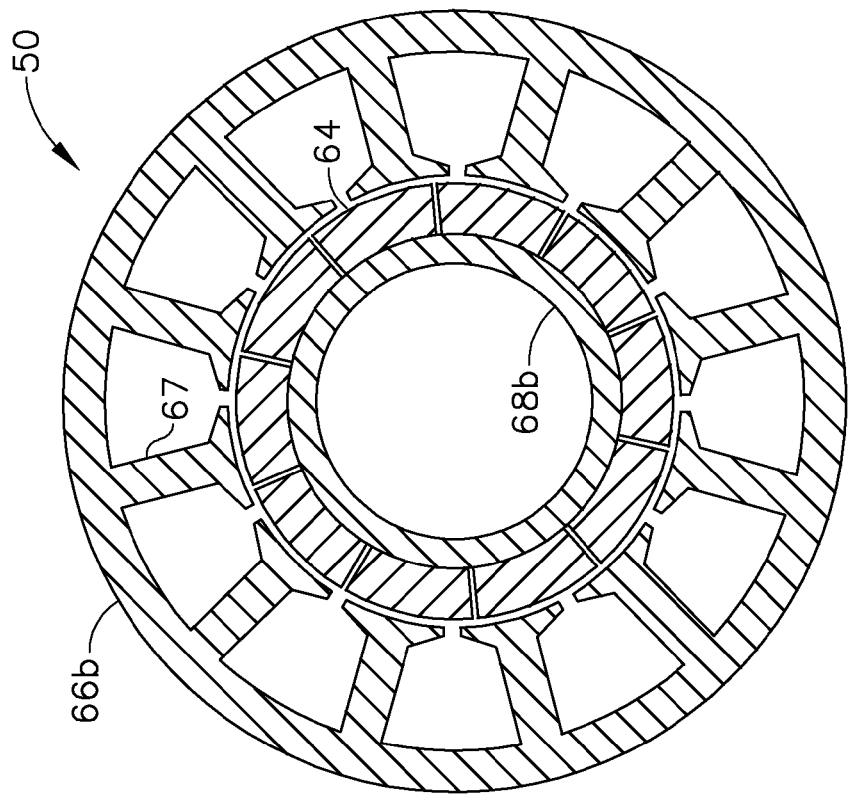
FIG. 5 is a schematic representation of a high-pole count permanent magnet machine of the present invention.
Figure 4:
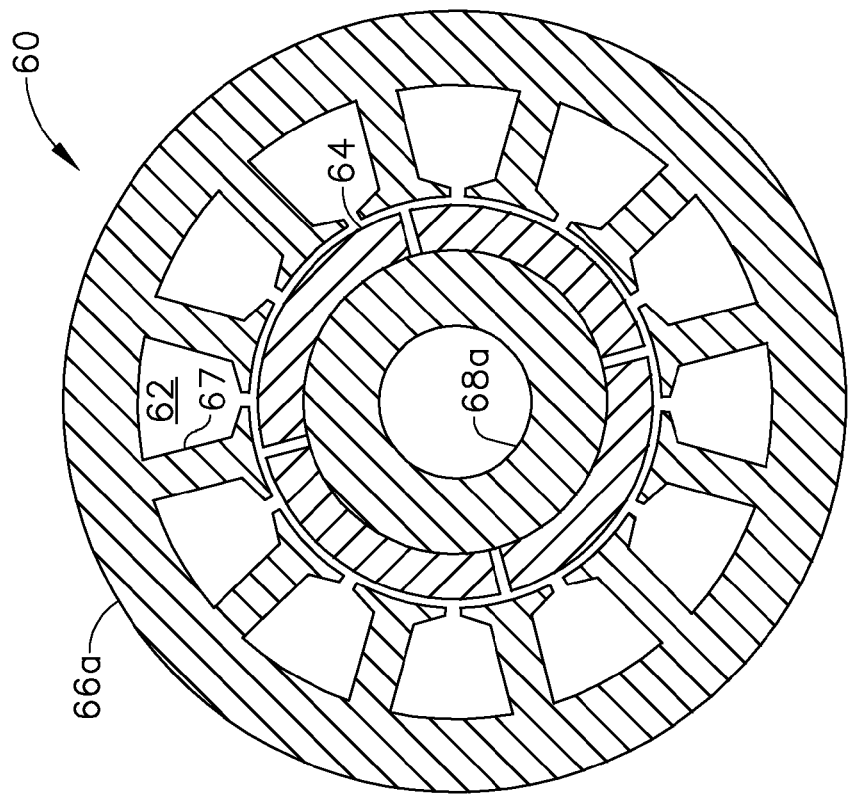
FIG. 4 is a schematic representation of a low-pole count prior art permanent magnet machine.

Referring next to FIGS. 4 and 5, which respectively show a prior art stator and rotor, and the stator and rotor of the present invention, the reduced size of the stator and rotor back iron is illustrated. In FIG. 4, a low-pole count machine 60 is shown having twelve slots 62 and four poles 64. The slots are defined by adjacent tooth portions 67. The poles 64 are affixed to the rotor back iron 68a, and the slots 62 receive pole windings (not shown), which are coiled around stator tooth portions 67. The tooth portions 67 extend radially inward from stator back iron 68a. By contrast, in FIG. 5, a high-pole count generator 50 of the present invention has twelve slots 62 and ten poles 64. The stator back iron 66b and the rotor back iron 68b are significantly reduced in thickness in the high-pole count generator 50, relative to low-pole count generator 50. The reduced size is achievable due to the inverse relationship between the number of poles and the magnetic flux per pole, i.e., as the number of poles gets higher, the magnetic flux/pole gets lower. The lower flux/pole requires less back iron to accommodate the same magnetic flux density.

Figure 6:
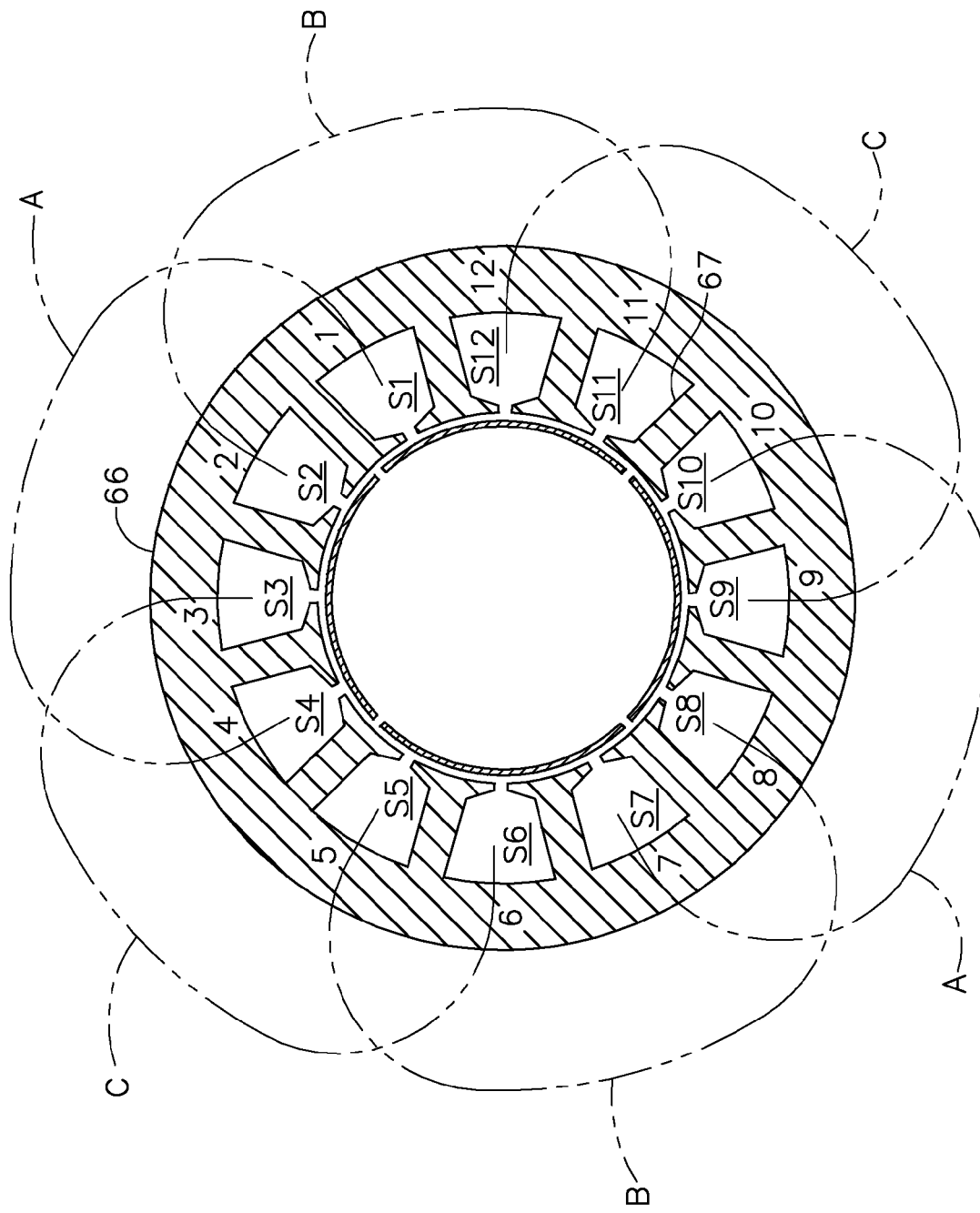
FIG. 6 is a schematic representation of a low-pole count prior art permanent magnet machine with distributed overlapping windings.
Figure 7:
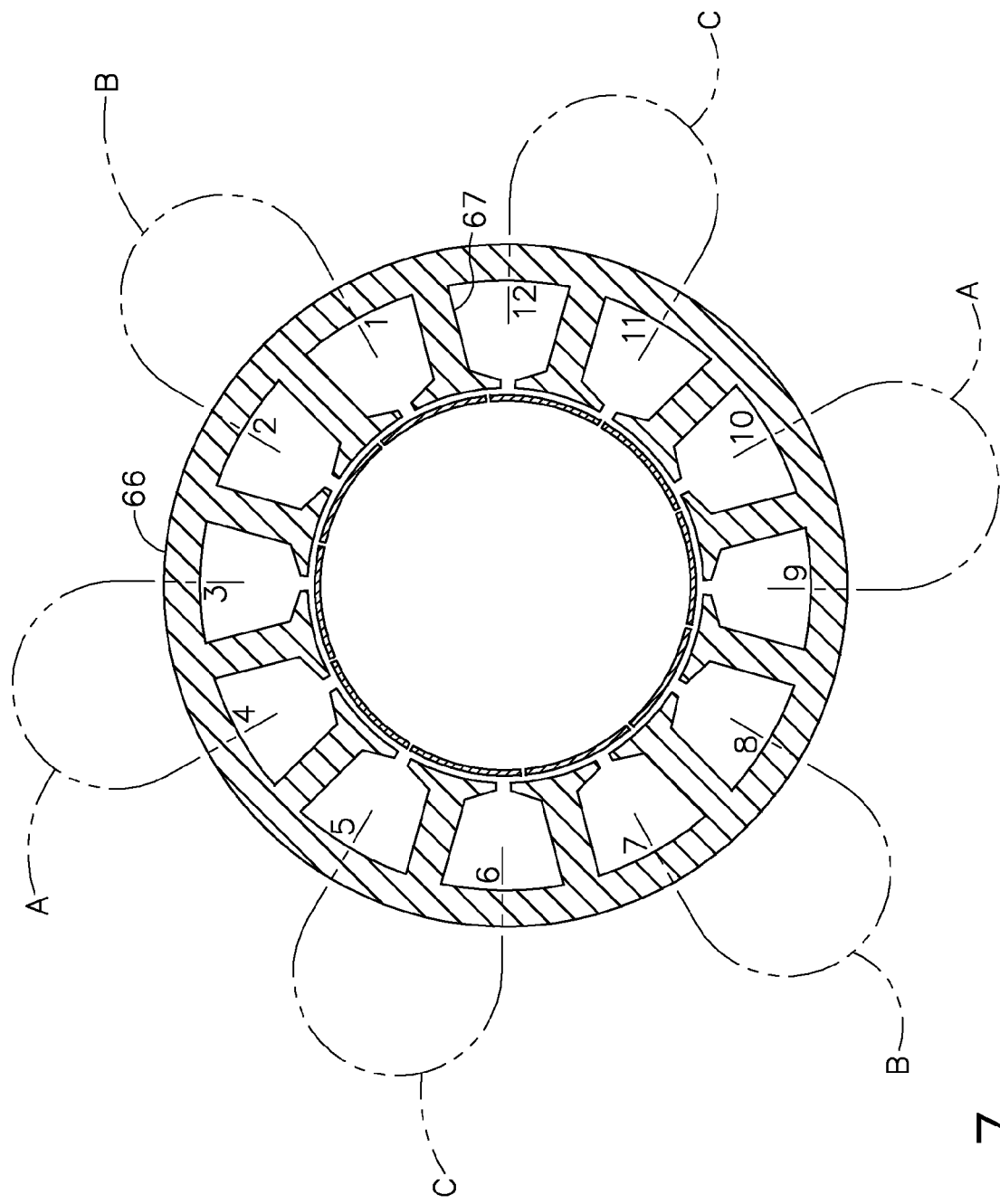
FIG. 7 is a schematic illustration of a high-pole count permanent magnet machine of the present invention having concentrated non-overlapping windings.
Figure 8:
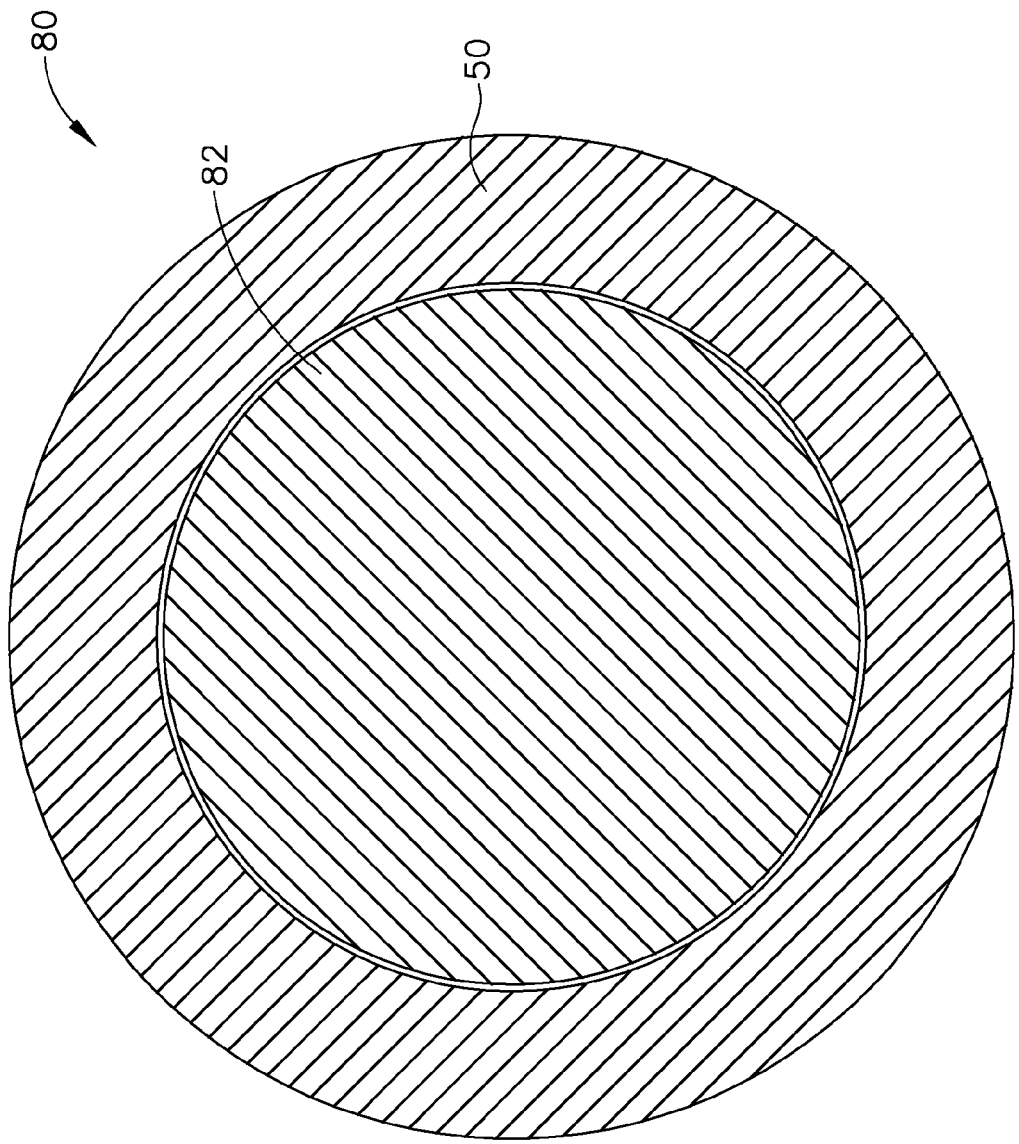
FIG. 8 is an alternate embodiment of the high speed, high pole count generator configured in combination with another generator driven by the HP turbine.

Referring next to FIGS. 6 and 7, an example of a prior art machine and a high pole count generator are shown for comparison purposes. In the low-pole count machine of FIG. 6, distributed overlapping windings of prior are shown and the distributed overlapping windings of the present invention are shown. Phase windings designated A, B and C are shown as overlapping one another. For example, phase winding A is connected between slots (s1) and (s4); phase winding B connected between slots (s2) and (s11); and phase winding C connected between slots (s3) and (s6). Since each phase is connected between non-adjacent slots, there is overlap in the flux paths circulating in the respective stator back iron 66 and tooth portions 67. By contrast, FIG. 7 illustrates the high-pole count machine 50. The phase windings in generator 50 are concentrated with phase windings A, B and C connected between adjacent slots, and thus providing non-overlapping, fault-tolerant stator windings. The non-overlapping, concentrated phase windings A, B and C improve the machine fault-tolerance because there is minimum coupling between the various phases. For example, in case of a fault in phase A, phases B and C will not be significantly affected, and the machine can still continue to produce a useful level of power, and the machine could produce the rated power if the machine phases were rated above the actual rated power. Referring to FIG. 8, the high-speed LP generator 50 can be part of a combination machine 80, having one or more HP spool generators 82 in the form of double-sided dual-rotor or single-stator dual-rotor configurations. The double-sided dual rotor configuration permits significant reduction in the overall frame size and cooling equipment sizes, as well as reduced weight. Further reduction in the size and weight of the shared stator yoke may be achievable, depending on the vector summation of the magnetic fluxes present in the dual machine configurations.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system for generating supplemental electrical power from the low-pressure (LP) turbine spool of a turbofan engine, the system comprising:
   a generator portion for generating electrical power, a gearbox for driving the generator portion, a controller portion for controlling an output of the generator; and a power converter for converting generator power to power a load;
   the LP turbine spool being mechanically coupled to the generator portion by the gearbox for driving the generator portion; and
   the controller portion in electrical communication with a speed sensing element for sensing a speed of the LP turbine spool;
   wherein during operation of the engine, the controller portion electronically disables the power converter in response to the speed of the generator portion exceeding a predetermined speed, and enables the power converter when the speed of the generator portion does not exceed the predetermined speed, such that the effective load on the generator portion is reduced to approximately zero when the LP turbine spool exceeds the predetermined speed.

2. The system of claim 1, wherein the generator portion having a speed and a high magnetic pole count, and the magnetic pole count inhibits the speed of the generator portion from exceeding a fundamental frequency limit of the power converter.

3. The system of claim 1, wherein the power converter is an electrically active power converter.

4. The system of claim 3, wherein the fundamental frequency limit is determined by a maximum pulse width modulated (PWM) frequency that can be achieved in the power converter.

5. The system of claim 1, wherein the generator portion is actively generating power during idle descent of an aircraft, the idle descent being associated with a generator speed less than or equal to the predetermined speed, and the generator is rotating passively with approximately zero load when the generator exceeds the predetermined speed.

6. The system of claim 1, wherein the generator portion has an active power generating range at speeds between about 1100 rpm multiplied by the gearbox ratio to and including 2200 rpm multiplied by the gearbox ratio; and a passive rotation range at speeds above 2200 rpm multiplied by the gearbox ratio to about 4500 rpm multiplied by the gearbox ratio.

7. The system of claim 6, wherein the gearbox ratio is in the range of five to ten.

8. The system of claim 1, wherein the generator portion having ten magnetic poles and twelve stator windings.

9. The system of claim 1, wherein the generator portion having a plurality of adjacent, non-overlapping magnetic pole pairs.

10. The system of claim 1, wherein the generator portion having a stator back iron portion and a rotor back iron portion, the stator back iron portion and the rotor back iron portion having significantly reduced thickness relative to low magnetic pole count generators.

11. The system of claim 2, wherein the generator portion having a plurality of electrical phases.

12. A system for generating supplemental electrical power from the low-pressure (LP) turbine spool of a turbofan engine, the system comprising:
   a generator portion for generating electrical power having a stator back iron portion and a rotor back iron portion, the stator back iron portion and the rotor back iron portion having significantly reduced thickness relative to low magnetic pole count generators;
   a gearbox for driving the generator portion, a controller portion for controlling an output of the generator;
   a power converter for converting generator power to power a load;
   the LP turbine spool being mechanically coupled to the generator portion by the gearbox for driving the generator portion;
   the controller portion in electrical communication with a speed sensing element for sensing a speed of the LP turbine spool; and
   wherein during operation of the engine, the controller portion electronically disables the power converter in response to the speed of the generator portion exceeding a predetermined speed, and enables the power converter when the speed of the generator portion does not exceed the predetermined speed, such that the effective load on the generator portion is reduced to approximately zero when the LP turbine spool exceeds the predetermined speed.

13. The system of claim 12, wherein the generator portion having a speed and a high magnetic pole count, and the magnetic pole count inhibits the speed of the generator portion from exceeding a fundamental frequency limit of the power converter.

14. The system of claim 12, wherein the power converter is an electrically active power converter.

15. The system of claim 14, wherein the fundamental frequency limit is determined by a maximum pulse width modulated (PWM) frequency that can be achieved in the power converter.

16. The system of claim 12, wherein the generator portion is actively generating power during idle descent of an aircraft, the idle descent being associated with a generator speed less than or equal to the predetermined speed, and the generator is rotating passively with approximately zero load when the generator exceeds the predetermined speed.

17. The system of claim 12, wherein the generator portion has an active power generating range at speeds between about 1100 rpm multiplied by the gearbox ratio to and including 2200 rpm multiplied by the gearbox ratio; and a passive rotation range at speeds above 2200 rpm multiplied by the gearbox ratio to about 4500 rpm multiplied by the gearbox ratio.

18. The system of claim 17, wherein the gearbox ratio is in the range of five to ten.

19. The system of claim 12, wherein the generator portion having ten magnetic poles and twelve stator windings.

20. The system of claim 12, wherein the generator portion having a plurality of adjacent, non-overlapping magnetic pole pairs.

* * * * *